UNITED STATES PATENT OFFICE.

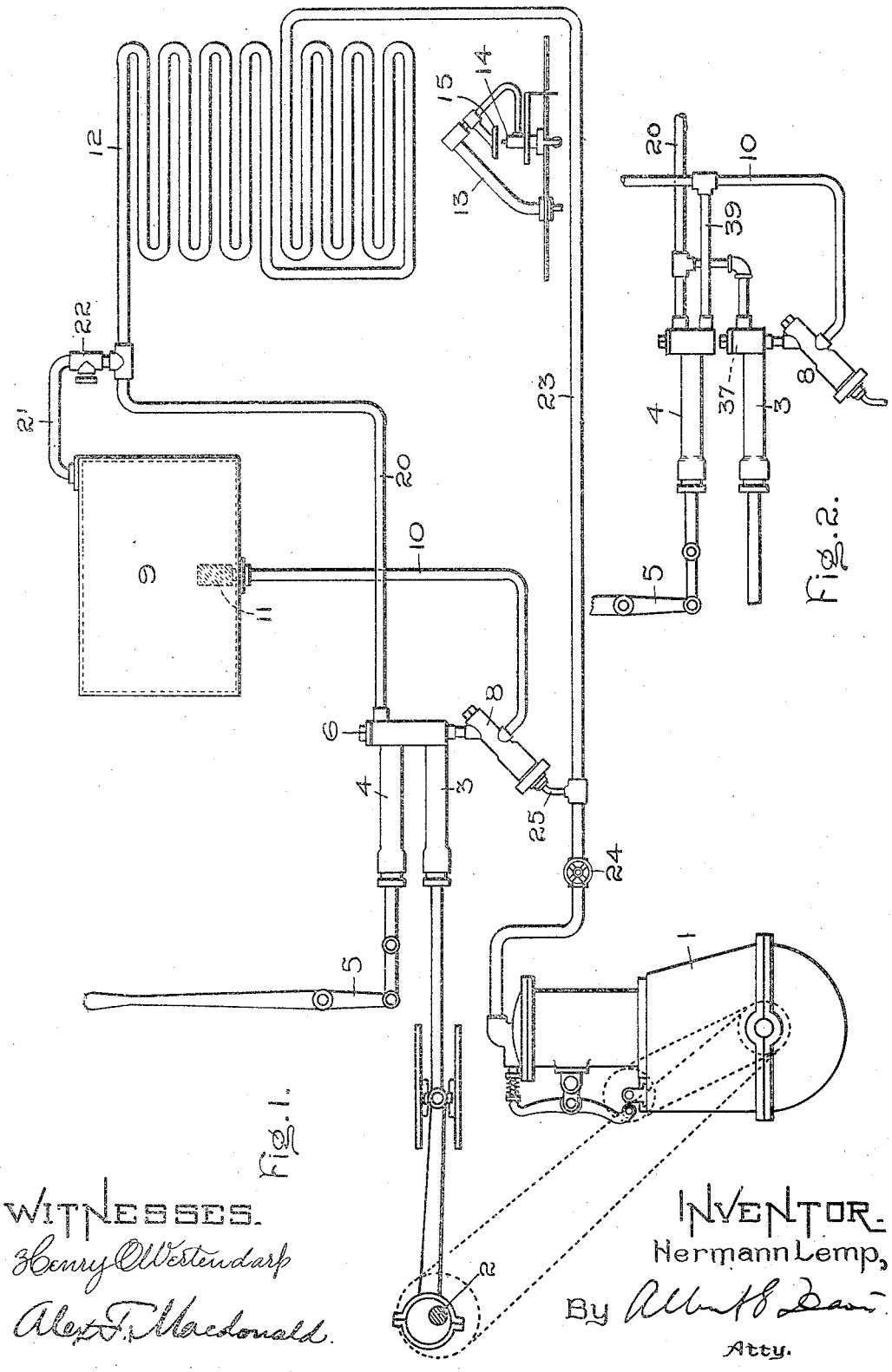

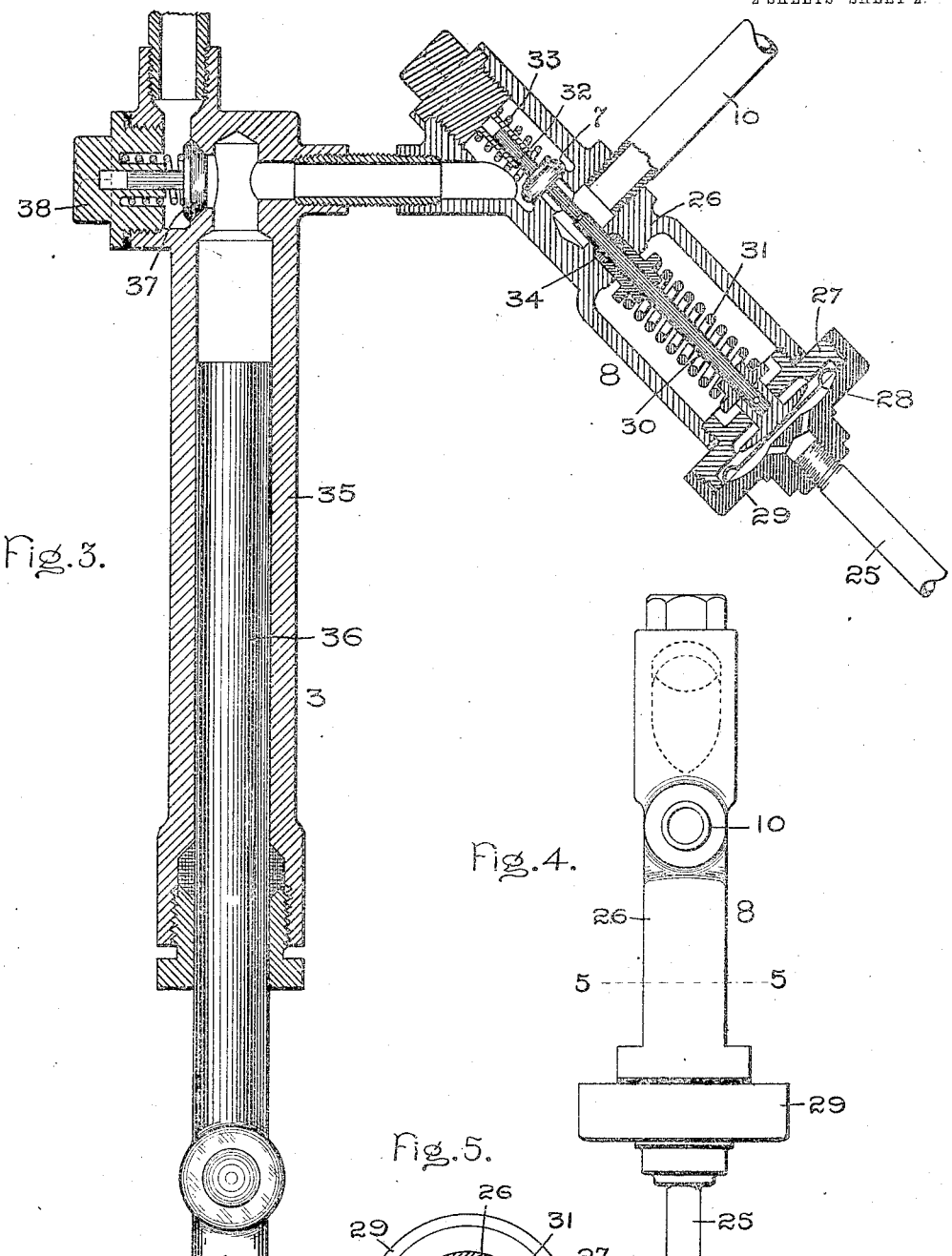

HERMANN LEMP, OF LYNN, MASSACHUSETTS, ASSIGNOR, BY MESNE ASSIGNMENTS, TO GENERAL ELECTRIC COMPANY, A CORPORATION OF NEW YORK.

SYSTEM OF WATER REGULATION FOR FLASH-BOILERS.

No. 818,382.          Specification of Letters Patent.          Patented April 17, 1906.

Application filed July 15, 1901. Serial No. 68,348.

*To all whom it may concern:*

Be it known that I, HERMANN LEMP, a citizen of the United States, residing at Lynn, in the county of Essex and State of Massachusetts, have invented certain new and useful Improvements in the System of Water Regulation for Flash-Boilers, of which the following is a specification.

In order to obtain the best results with flash-boilers, it is necessary to closely regulate the amount of water that is being continually supplied thereto. Boilers of this class have little or no storage-space for water and steam, so that as the demand for steam changes so must the supply of water.

The object of the present invention is to provide an improved system of regulation for flash-boilers whereby the necessary amount of water is automatically varied as the demand for steam changes, and this in a simple and reliable manner.

My invention will be described in connection with a system of regulation designed for an automobile, since it has great utility in that connection; but it is to be understood that the invention is applicable to other forms of apparatus.

In the accompanying drawings, which illustrate an embodiment of my invention, Figure 1 is a diagrammatic view of my improved water-supply system. Fig. 2 is a slight modification of the arrangement of the pumps. Fig. 3 is a vertical section through the power-pump and regulator. Fig. 4 is a side elevation of the regulator; and Fig. 5 is a section thereof, taken on the line 5 5 of Fig. 4.

Referring to Fig. 1, 1 represents an engine of any desired construction, and geared thereto by any suitable means, such as sprockets and chains, is a shaft 2, which carries an eccentric for actuating the automatic water-pump 3. Situated directly over the pump 3 is a second water-pump 4, which is actuated manually by means of the lever 5. The pumps are connected in series, and the delivery thereof is controlled by the pressure-valve 6, while the suction is controlled by the valve 7, Fig. 3, in the regulator 8. The water-supply is contained in the tank 9, and between the tank and the regulator 8 is a pipe 10 for conveying the water. The upper end of the pipe where it opens into the tank is provided with a filter 11 to prevent impurities in the water from passing into the regulator and pumps. The boiler 12 is of the well-known flash type and is heated in any suitable manner. In the present instance a fuel-burner is shown for that purpose and consists of the vaporizer 13, the nozzle 14, and baffle-plate 15, the latter being employed to distribute the flames over somewhat extended areas.

In describing this invention it has been assumed that the flame from the burner is sufficient at all times to convert the water delivered by the pumps into steam. No means are shown for regulating the flame, as it forms no part of the present invention. The delivery end of the pumps is connected by a pipe 20 with one end of the boiler, and between the boiler and the pump is a connection 21, leading to the water-tank 9. This connection contains a relief-valve 22, which is so arranged that when for any reason water is in excess is delivered to the boiler it will be returned to the tank. It will also return water to the tank when no steam is drawn from the boiler and the pressure thereof increases to an abnormal amount; but under ordinary conditions this valve is not used, for the regulator 8 insures the delivery of the proper amount of water. The steam end of the boiler is connected to the engine by means of the pipe 23, and between the boiler and the engine is a throttle-valve 24 for controlling the action of the engine. At a point between the boiler and the throttle-valve is a connection 25, leading to the regulator 8.

Referring to Fig. 3, the construction of the regulator will be described. The regulator consists of a casing 26, having an enlarged screw-threaded head 27. This head is firmly secured in place and furnishes a seat for the diaphragm 28. The latter is held in place by a screw-threaded head 29, which head is provided with a screw-threaded opening to receive the steam-pipe 25, and this opening communicates with the space between the head and the diaphragm, so that as the steam-pressure varies the diaphragm will be deflected to a greater or less extent from the central position. The screw-threaded head 27 is provided with a central opening to receive the spring-pressed plunger 30. The latter is provided with an enlarged and slightly-rounded head, which engages with the diaphragm 28 and is moved upward or into an operative position thereby. Surrounding the plunger is a coiled compression-spring 31, which tends at all times to force the head of the plunger downward or against the diaphragm. The upper end of the regulator is provided with a suction-valve 7, which consists of a flat-sided disk, having a guide-rod 32 and a coiled compression-spring 33, which tends at all times to hold the valve in a closed position. This suction-valve controls the admission of water from the pipe 10 to the automatic water-pump 3 and also to the hand-pump 4. The spring-pressed plunger 30 extends through a suitable packing-box 34 and engages with the suction-valve 7. When the steam-pressure on the diaphragm is below a certain predetermined point, the suction-valve 7 will be automatically seated and unseated during the operation of the pump or pumps to permit liquid to flow in one direction in the ordinary manner; but as soon as the steam-pressure increases above that point the valve is raised and maintained in that position until the pressure has been reduced. The automatic water-pump consists of a cylinder 35 and a piston 36. This pump is of the single-acting type, and the delivery is regulated by a spring-pressed valve 37. The valve is retained in place by the screw-threaded head 38. The inlet is a free passage and is not controlled by a check-valve, as is the outlet-passage, for the reason that the suction-valve is included in the regulator, which may be detachably connected at any suitable point in the suction-pipe. This simplifies the pump construction and enables the regulator to be located at the most convenient point in the piping system of the automobile without complicating connections, which is an important matter in such apparatus. It will be noted that the regulator is a self-contained or unitary device, comprising a casing provided with suitable coupling connections for piping and including an automatic valve and a pressure-diaphragm for rendering the valve inoperative by holding it off its seat. The regulator may also under certain circumstances be used on delivery side of the pump and, in fact, in any case where liquid is intended to be supplied in one direction only under certain conditions and to be permitted to flow in the manner specified under any other conditions.

Referring to Fig. 2, I have shown the automatic water-pump 3 and the hand water-pump 4 connected in multiple instead of in series, as in Fig. 1. The hand-pump receives water from the tank by a connection 39, which is independent of the regulator 8. This necessitates the use of a suction and pressure valve in the pump, as is customary. The two pumps deliver water to the connection 20 to the boiler, as before, and the automatic pump has a pressure-valve 37 and is dependent on the regulator 8 for controlling the suction. The construction and arrangement of the pump shown in Fig. 1 is simpler; but in certain instances the multiple connection of Fig. 2 may be found to be more desirable.

Assuming that the apparatus is mounted on a vehicle and that a suitable fire is provided for heating the boiler, the lever 5 is given a few strokes, thereby causing the pump 4 to deliver water to the boiler. As soon as this is done steam is generated in the boiler and is admitted to the engine through the throttle-valve 24. As soon as the engine starts into operation motion is imparted to the shaft 2, which drives the eccentric of the automatic pump 3. The pump 3 will now deliver the necessary amount of water to the boiler. When a definite increase in pressure on the boiler is reached, it will act upon the diaphragm 28 and force the spring-pressed plunger 30 upward, so that it will raise the suction-valve 7 from its seat. Under this condition the piston of the automatic pump 3 will run free and the water instead of being forced into the boiler will be churned back and forth. In other words, as the piston moves outward it will draw water from the tank through the pipe 10, and when it is forced inward it will return the water to the tank. By such an arrangement virtually all of the load is removed from the agency which supplies power to the pump. The small amount of power required to overcome the friction of the water in the tubes and pump may be disregarded. As soon as the boiler-pressure falls, thereby indicating that more water is needed, the diaphragm 28 will return to its normal position and permit the suction-valve 7 to seat. As soon as this is done the automatic water-pump 3 begins to deliver the necessary amount of water as before. Since very little work is required in overcoming the friction in the tubes, the pump 3 can be made of a very large capacity, so as to deliver sufficient water even when the vehicle is moving up a hill at a very low speed. On the other hand, if the vehicle is coasting at a high speed and practically no water is required the pump will merely churn the water to and fro without forcing any of it into the boiler. If at any time it should happen that the automatic pump is incapable of supplying the necessary amount of water, it can be assisted by the hand-pump, and the action of these pumps will be under the control of the regulator.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

Having thus described my invention, what I claim as new, and desire to secure by Letters Patent of the United States, is—

1. In combination, a pump, a tank containing liquid, a boiler supplied by the pump, and a device which normally acts as an automatic suction-valve for the pump and is adapted to be rendered inoperative by the steam-pressure of the boiler when such pressure becomes abnormally great.

2. In combination, a pump, a tank containing liquid, a boiler supplied by the pump, a single valve between the tank and the pump which automatically opens toward the latter, and means for holding the valve open when the steam-pressure on the boiler becomes excessive, and a conduit for conveying steam to said means.

3. In combination, a boiler, an engine, a pump driven from the engine, a spring-seated suction-valve located exterior to the pump structure, a regulator which is connected to the steam-pipe on the boiler side of the throttle and is acted upon by the boiler-pressure, and means acted upon by the regulator for controlling the suction-valve of the pump.

4. In combination, a boiler, a source of water-supply, a pump having a fixed length of stroke, spring-seated suction and delivery valves for the pump, a connection extending between the pump and the source of supply in which the suction-valve is located, and a regulator also located in said connection which is acted upon by the boiler-pressure for raising the suction-valve of the pump when the boiler-pressure rises above a predetermined amount.

5. In combination, a boiler, an engine, a pump driven thereby, a spring-seated suction-valve therefor, and a regulator comprising a spring-pressed plunger arranged to move into and out of engagement with the valve, and a diaphragm which is controlled by the steam-pressure of the boiler for actuating the plunger in a manner to raise the valve when the pressure increases to a certain point.

6. In combination, a boiler, a manually-actuated pump, an automatically-actuated pump, both delivering water to the boiler, a pump, a controlling-valve which is common to both pumps, a device which is adapted to be acted upon by the boiler-pressure for opening the valve when the boiler-pressure rises above a certain point, and a casing separated from the pumps which contains the device and the controlling-valve.

7. In combination, a boiler, a manually-actuated pump, an automatically-actuated pump, both delivering water to the boiler, a suction-valve which is common to both pumps and is located on the inlet side of the automatically-actuated pump, a steam-actuated diaphragm operatively connected to the suction-valve and adapted to raise the same to relieve the automatically-actuated pump of substantially all of its load, and a delivery-valve which is also common to the pumps and is located on the outlet side of the manually-actuated pump.

8. In combination, a manually-actuated piston, a power-piston, cylinders therefor, a pipe in series with the cylinders, a valve in the pipe adapted to open automatically toward the cylinders, and a diaphragm which is acted upon by fluid-pressure for raising the valve from its seat when the pressure exceeds a certain point.

9. In combination, a pump having a free passage, a detachable conduit connected with the pump and communicating with said passage, a check-valve in said conduit, and an automatic regulator which renders the check-valve inoperative.

10. In combination, a flash-boiler, a pump for supplying liquid thereto, a steam-actuated regulator for controlling the supply of liquid to the boiler, a connection between the regulator and the boiler, said regulator comprising an automatic suction-valve, a pressure device adapted to act upon the valve, and a casing containing the said device and valve.

11. In combination, a boiler, a liquid-containing tank, a conduit between them, a power-pump in the conduit, a steam-actuated regulator between the pump and the tank, means between the power-pump and the boiler for supplying liquid to the latter, a steam-consumption device, a steam-supply conduit between the boiler and the said device, and a connection between said latter conduit and the regulator.

12. In combination, a boiler, a source of water-supply, a conduit connecting the two, two pumps included in the conduit, a single automatically-actuated valve in the conduit on the suction side of the pumps, and a device controlled by the pressure of the boiler for holding the valve open when the steam-pressure reaches a predetermined point.

13. In combination, a boiler, an engine, a steam-supply conduit between them, a source of liquid-supply, a conduit connecting said source with the boiler, a power-pump included in said latter conduit which derives its power from the engine, means for supplying liquid to the boiler separately or in conjunction with the pump, and means in the steam-supply conduit which is governed by the boiler-pressure for controlling the quantity of liquid supplied to the boiler.

14. In a regulator for liquid-supplying systems, the combination of a casing having inlet and outlet passages, and containing an automatically-actuated valve between the passages, a seat for the valve, a spring for seating the valve, means which acts upon the
5 valve for opening it against the tension of said spring, and a steam-actuated diaphragm which operates said means.

In witness whereof I have hereunto set my hand this 12th day of July, 1901.

HERMANN LEMP.

Witnesses:
   ALEX. F. MACDONALD,
   DUGALD McK. McKILLOP.